(12) United States Patent
Kay

(10) Patent No.: US 7,934,701 B2
(45) Date of Patent: May 3, 2011

(54) SAFETY HANDRAIL APPARATUS AND MANUFACTURING METHODS

(76) Inventor: Ronald J. Kay, Barrington, IL (US)

( * ) Notice: Subject to any disclaimer, the term of this patent is extended or adjusted under 35 U.S.C. 154(b) by 0 days.

(21) Appl. No.: 12/215,971

(22) Filed: Jul. 1, 2008

(65) Prior Publication Data
US 2010/0001246 A1 Jan. 7, 2010

(51) Int. Cl.
E04F 11/18 (2006.01)

(52) U.S. Cl. .............................. 256/59; 256/1

(58) Field of Classification Search .............. 256/59, 256/65.16; 362/84, 145, 146
See application file for complete search history.

(56) References Cited

U.S. PATENT DOCUMENTS

| | | | |
|---|---|---|---|
| 4,161,769 A | 7/1979 | Elliott | |
| 4,515,393 A | 5/1985 | Sauter | |
| 5,099,402 A | 3/1992 | Starniri | |
| 5,165,643 A | 11/1992 | Shreiner | |
| 5,396,740 A * | 3/1995 | Bocchi | 52/33 |
| 5,450,299 A | 9/1995 | Lepre | |
| 5,504,342 A | 4/1996 | Jaynes et al. | |
| 5,680,730 A * | 10/1997 | Epple | 52/28 |
| 5,724,909 A * | 3/1998 | Pitman et al. | 116/202 |
| 5,775,016 A * | 7/1998 | Chien | 40/544 |
| 5,779,228 A * | 7/1998 | Hansen | 256/65.05 |
| 5,887,856 A * | 3/1999 | Everly, II | 256/1 |
| 6,065,852 A * | 5/2000 | Crumley | 362/146 |
| 6,074,739 A * | 6/2000 | Katagiri | 428/323 |
| 6,212,809 B1* | 4/2001 | Gaule | 40/660 |
| 6,237,266 B1* | 5/2001 | Tassey et al. | 40/542 |
| 6,270,058 B1* | 8/2001 | Williams et al. | 256/59 |
| 6,276,634 B1* | 8/2001 | Bodle | 244/118.5 |
| 6,307,207 B1* | 10/2001 | Burbank | 250/462.1 |
| 6,415,732 B1 | 7/2002 | Delorenzo | |
| 6,425,676 B1 | 7/2002 | Lyons | |
| 6,854,163 B1 | 2/2005 | Ruana | |
| 6,866,125 B2 | 3/2005 | Ball et al. | |
| 6,916,103 B2* | 7/2005 | Currie et al. | 362/145 |
| 7,131,747 B1* | 11/2006 | Yates | 362/219 |
| 7,226,191 B1* | 6/2007 | Martinez | 362/400 |
| 7,367,699 B2* | 5/2008 | Lierow | 362/471 |
| 2002/0036121 A1 | 3/2002 | Ball et al. | |
| 2004/0126567 A1 | 7/2004 | Dimond et al. | |
| 2004/0184259 A1* | 9/2004 | To | 362/84 |
| 2007/0058357 A1* | 3/2007 | Yamaguchi et al. | 362/84 |

* cited by examiner

Primary Examiner — Joshua T Kennedy
(74) Attorney, Agent, or Firm — Valauskas Corder LLC

(57) ABSTRACT

A safety handrail apparatus including a support component with channel element and a light emission component. The safety handrail apparatus and components thereof are manufactured by extrusion, co-extrusion, injection molding, insert injection molding, two shot molding or a combination thereof. The safety handrail apparatus allows configuration into any desired length handrail by interconnecting any number of individual handrail apparatuses.

18 Claims, 7 Drawing Sheets

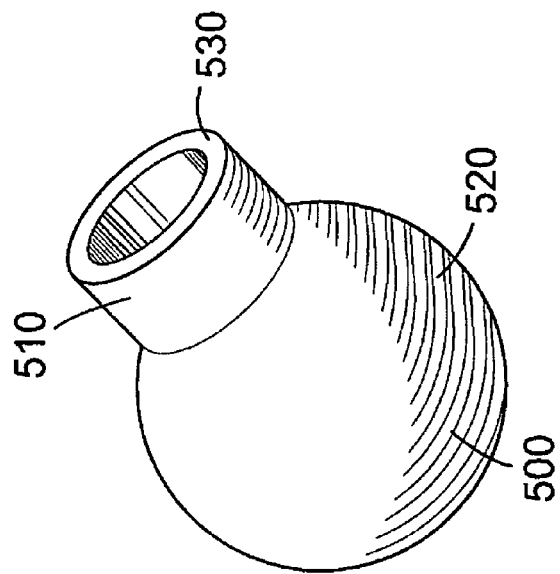
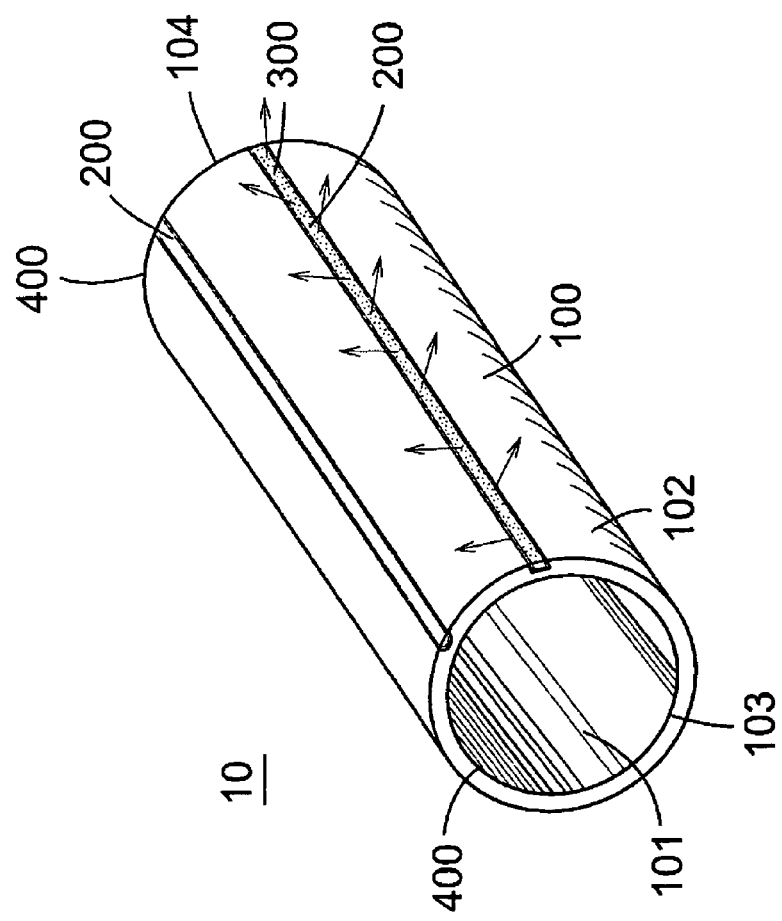
FIG. 1B
FIG. 1A

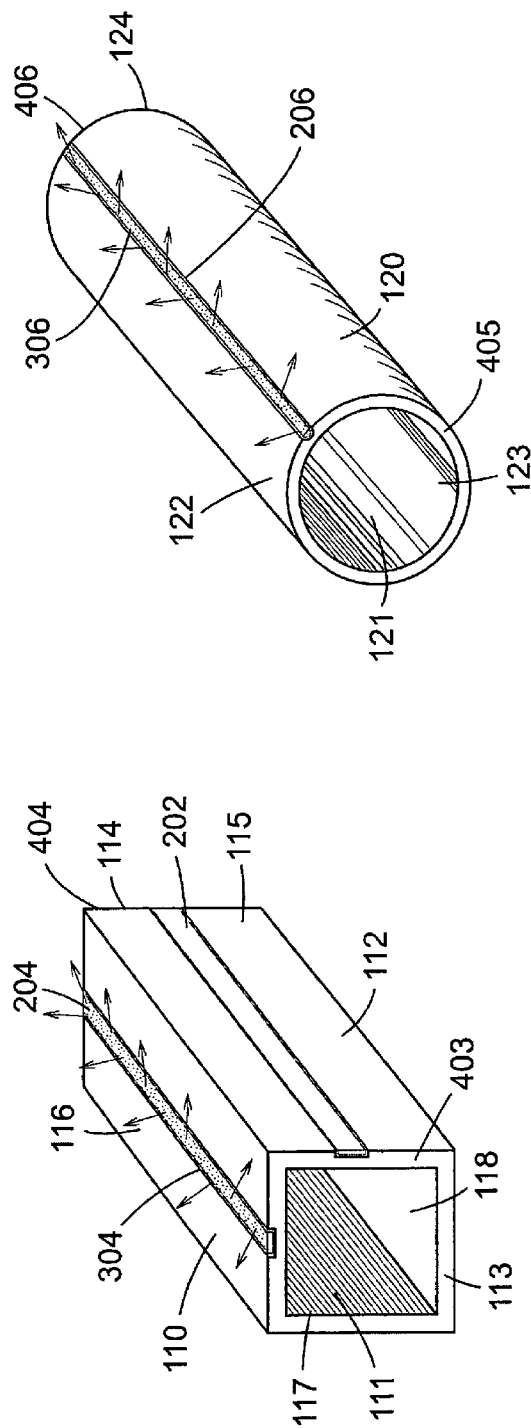
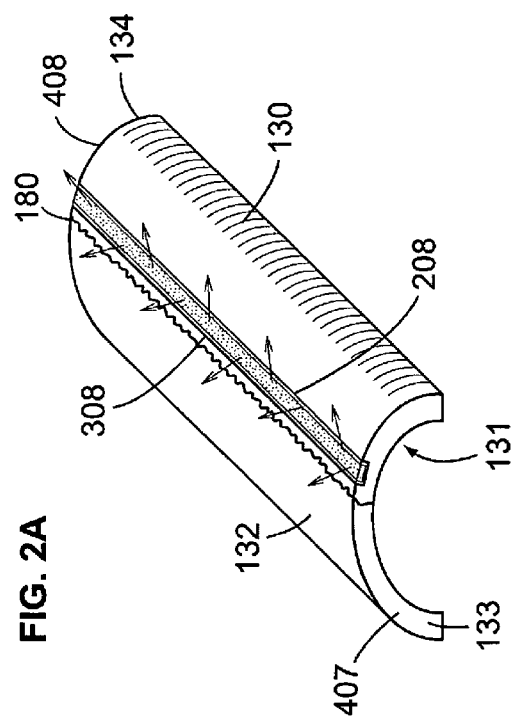
FIG. 2A
FIG. 2B
FIG. 2C

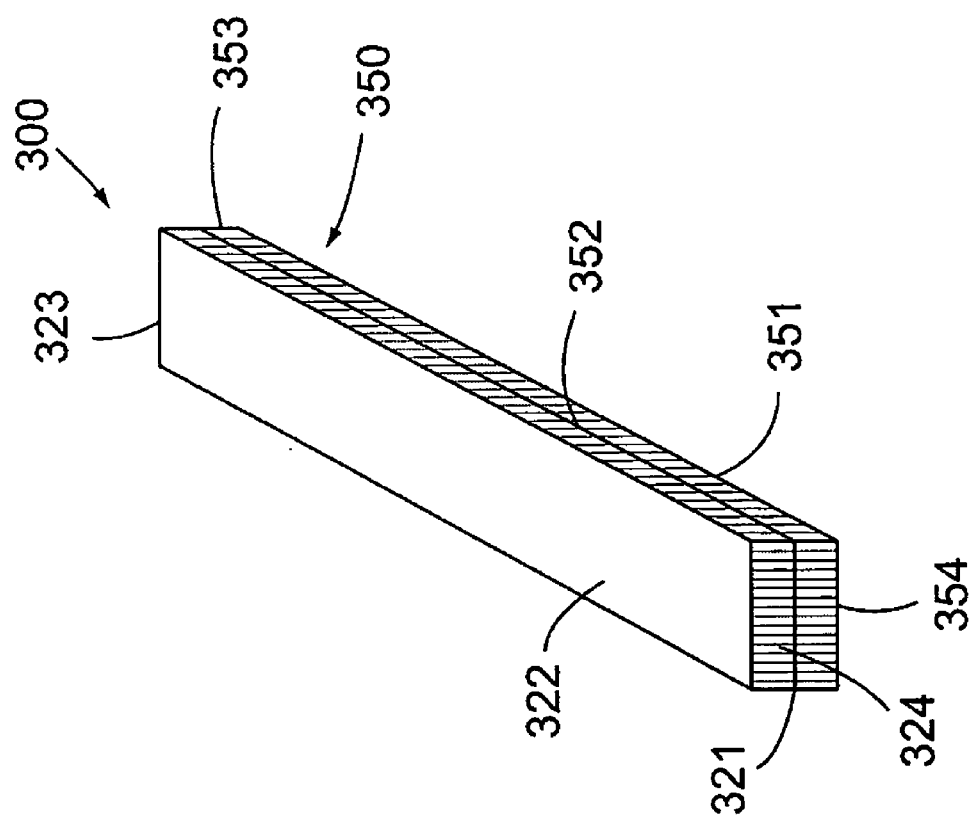
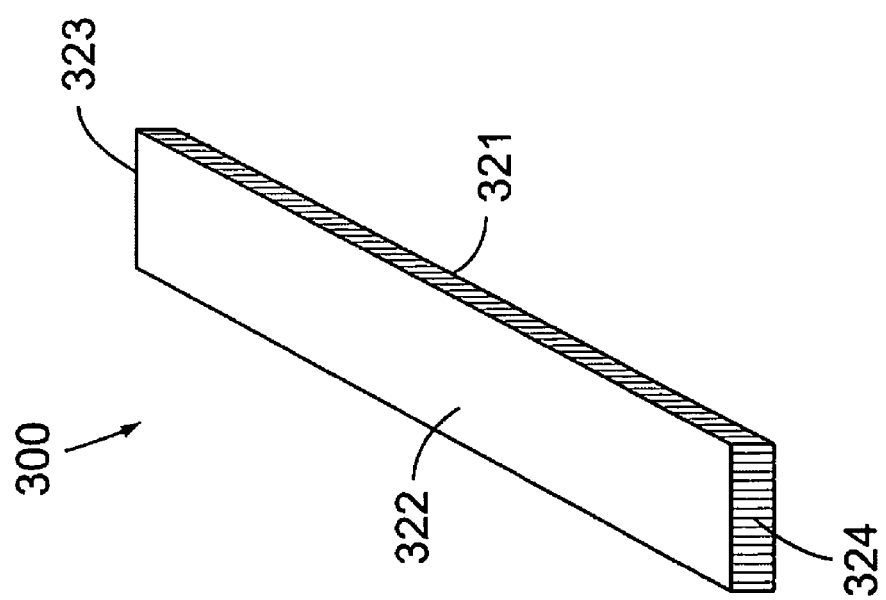
FIG. 4B
FIG. 4A

SAFETY HANDRAIL APPARATUS AND MANUFACTURING METHODS

FIELD OF THE INVENTION

The present invention relates generally to handrails and more particularly to a safety handrail with a light emission component and improved manufacturing thereof.

BACKGROUND OF THE INVENTION

Handrails are used in a variety of environments both indoors and outdoors, for example, architectural structures such as buildings, theatres, arenas, stores, decks, docks, piers, parking lots, showers, bathtubs, vehicles including automobiles, trucks, boats, tractors, airplanes and trains, and furniture such as hospital or nursing home beds, deck posts and sign posts to name a few.

Handrails are rail or bar structures that are typically designed to be grasped by the hand for support. Handrails may be used to assist in maneuvering, for example, to travel on a stairway, ramp way, hallway, and escalator, or to assist in getting into and out of an environment, such as a vehicle. Handrails may also be used as a guard or barrier, such as on a balcony, landing, or hospital bed.

Many environments exist where various poor lighting scenarios occur, for example, dimmed lighting or darkness due to a power failure or smoke resultant from a fire. Risks may occur when people attempt to navigate in poorly lit environments; such risks include physical injury, lack of orientation, lack of information regarding navigation and lack of familiarity with the environment.

To mitigate these risks, illuminated handrail devices exist, but these prior art devices are deficient in several respects. First, prior art illuminated handrail devices are manufactured to a specific length. Second, prior art devices include numerous components as well as require an electrical power source. Third, prior art devices involve multiple steps for manufacture, which is costly and time consuming.

Examples of prior art devices that require an electrical power source to power a light bulb include U.S. Pat. No. 6,425,676, U.S. Pat. No. 6,415,732, U.S. Pat. No. 5,504,342, U.S. Pat. No. 5,450,299, U.S. Pat. No. 5,099,402, U.S. Pat. No. 4,161,769, and U.S. Pat. No. 4,515,393.

U.S. Pat. No. 6,866,125 describes an illumination system for escalator handrails with a plurality of charging stations to provide electromagnetic power to charging circuits. The power transferred between the charging circuit and charging station is sufficient to charge a power source that powers a light source. U.S. Pat. No. 7,226,191 describes a lighted handgrip assembly that includes an electrical circuit that illuminates a lighting assembly within a gripping member.

U.S. Pat. No. 5,724,909 describes a passive pathway marking system with a base member, support member and a photo luminescent material. The base member attaches to a building structure, the support member attaches to the base member and the photo luminescent material, preferably in two stripes, is affixed to the support member.

While these devices fulfill their respective particular objectives and requirements, the need still remains for an improved safety handrail apparatus and manufacturing methods that fulfills the deficiencies of these prior art devices. The present invention satisfies this need.

SUMMARY OF THE INVENTION

The improved safety handrail apparatus and methods of the present invention include a support component and a light emission component. The apparatus of the present invention does not require an electrical power source to power the light emission component. Additionally, embodiments of the present invention contemplate one-step, two-step, or three-step manufacturing processes integrating the light emission component with the support component of the handrail apparatus.

The present invention also allows for a handrail apparatus configuration of any desired length by interconnecting any number of individual handrail apparatuses. Additionally, the present invention may include an end cap component to finish or complete the ends of the support component.

The support component and light emission component of the present invention are made of any material that can be molded or extruded, for example metal such as aluminum, or polymers. Polymers include plastics such as thermoplastic, thermoset plastic, polyurethane, polyethylene, polypropylene and engineering plastic, for example, synthetic polymers including nylon. The materials may further be compounded with a glass fiber to maintain rigidity such that the apparatus does not warp or twist during manufacturing or installation. The material used for the safety handrail apparatus is easily cut, for example on a table saw or miter saw, to form various configurations such as to accommodate varying lengths. It is further contemplated that the material may be cured by a radiation source such as ultraviolet (UV) light or contain a UV additive in the material. Additionally, the material may be impact modified to improve the material properties such as wear, non-slip, and weatherability. Additionally, the material may be flexible in order to assemble over existing handrails.

The materials used to manufacture the support component and light emission component may further be compounded with any color concentrate to allow for color matching. The entire safety handrail apparatus may be manufactured with any color concentrate, including those that emit light such that the entire apparatus illuminates.

According to the present invention, the support component includes an inside surface and an outside surface and may be any length, shape or size. For example, in one embodiment, the support component may be about and including 4 feet to about and including 12 feet in length, circular cross section, and 1½ inches to 3 inches in diameter. In another embodiment, the support component may be about and including 20 feet or greater in length. Other examples include cross sectional shapes of square, rectangular, pentagonal, and trapezoidal, to name a few. It is also contemplated that the present invention can be a semi-shape such as semi-circular, semi-rectangular and semi-square in order to assemble over existing handrails.

The support component includes a channel element. The channel element may be, for example, about and including ⅝ inches to about and including 2½ inches in width. The channel element may further run along the entire length or a portion of the entire length of the outside surface of the support component. Any depth of the channel element is contemplated in order to receive the light emission component. It is further contemplated that the channel element can be any cross-sectional shape such as dovetail, triangular, square, to name a few.

It is also contemplated that the support component includes a living hinge element. A living hinge element is a thin flexible hinge that may be formed during manufacturing such as by injection molding or may be a separate part such as a thin strip of material, such as polyethylene and polypropylene, that is molded into component to create a line along which the component can bend. Properly designed and executed, the living hinge element can be closed and opened over the life of the component with little or no loss of function. Embodiments of the present invention that include a support component with a living hinge element assists in assembling the handrail apparatus over existing handrails.

The light emission component is positioned in the channel element of the support component such that it is on the outside surface of the support component. The light emission component stores energy, for example, as by absorbing photons and releasing the energy as light over a duration of time. The light emission component is capable of producing a sustained visible glow including in darkness such as at a minimum of one hour or longer. According to the present invention, the light emission component is a material with a fluorescent or photoluminescent quality, for example, strontium oxide, strontium aluminate or metal sulfides such as calcium sulfide, strontium sulfide, zinc sulfide, and cadmium sulfide. The light emission component may further be a metal or polymer and may even be compounded with a color concentrate that emits light.

In another embodiment of the present invention, the light emission component further includes a substrate element. The substrate element according to the present invention is made of any material that can be molded or extruded, for example metal such as aluminum, or polymers. Additionally, the substrate element may be a substance such as a tape or film used in co-extrusion or triple-extrusion processes. The substrate element is any length, shape or size to be positioned adjacent to the light emission component. The advantages of a substrate element are that it may intensify the illumination of the light emission component by preventing the support component from "bleeding through" the light emission component. In a preferred embodiment, the substrate element is white although any color is contemplated to achieve the advantages discussed herein.

For purposes of this application, the term "light emission component" used herein may include the light emission component or the light emission component with substrate element.

Although numerous configurations are contemplated, in a preferred embodiment the light emission component, is positioned substantially about the channel element and is about and including 5/8 inches to about and including 1½ inches in width and runs along the entire length or a portion of the entire length of the channel element of the outside surface of the support component. In another embodiment, the channel element may be about and including 1½ inches to about and including 2½ inches in width.

In another embodiment, the present invention allows configuration into any desired length handrail by interconnecting any number of individual handrail apparatuses. For example, a first handrail apparatus may be interconnected to a second handrail apparatus and so on. Interconnection includes heat stake, weld, snap-fit such as annular snap fit or cantilever snap fit, adhesive, adhesive tape, fasteners or interference fit. For purposes of this application, the term "weld" includes sonic weld, vibration weld, orbital weld, ultrasonic weld, frictional weld, spin weld and laser weld, to name a few.

The present invention is manufactured by extrusion, co-extrusion, triple-extrusion, injection molding, insert injection molding, or two shot molding. Extrusion is a process for manufacturing wherein material is pushed or drawn through a die in the desired shape of a fixed cross-sectional profile of the apparatus. The apparatus is cooled and solidified as it is pulled through the die. In one embodiment, the support component and light emission component are integrally extruded to achieve the improved safety handrail apparatus according to the present invention.

Co-extrusion is the manufacturing process of extruding two or more materials through a single die with two or more orifices arranged so that the two or more materials, which may further be of different color, merge and weld together. Each material is fed to the die from a separate extruder, but the orifices may be arranged so that each extruder supplies two or more plies. Each ply may be of the same material, or each ply may be of different materials, for example, one ply of a photoluminescent polymer material and the other ply of a non-photoluminescent material. In one embodiment according to the present invention, the support component and the light emission component are co-extruded using two plies to achieve the improved safety handrail apparatus. In another embodiment, one ply may be a substance, such as film or tape, that acts as the substrate element and the other ply is a photoluminescent material that is co-extruded upon the substance.

Triple-extrusion is the manufacturing process similar to co-extrusion, except that three or more materials are extruded through a single die with three or more orifices arranged so that the three or more materials merge and weld together. The three or more materials of a triple-extrusion process may each be of different color. Each material is fed to the die from a separate extruder, but the orifices may be arranged so that each extruder supplies three or more plies. Each ply may be of the same material, or each ply may be of different materials, for example, one ply of a photoluminescent polymer material and two other plies of a non-photoluminescent material.

It is also contemplated that the components of the present invention can be textured by a calender during the extrusion, co-extrusion, or triple-extrusion process. A calender is a series of hard or heat-treated pressure rollers used to create a texture detail, for example on the outside surface of the support component or on the exterior surface of the light emission component. A texture detail includes, for example, bumps, ridges, or grooves.

Injection molding is a manufacturing process for making components by injecting materials at high pressure into a mold shaped as the inverse of the desired shape of the component. In one embodiment, the support component and light emission component are individually injection molded. The support component and light emission component are then interconnected, for example, heat stake, weld, snap-fit such as annular snap fit or cantilever snap fit, adhesive, adhesive tape, fasteners or interference fit.

It is also contemplated that the support component is extruded and the light emission component is injection molded or the support component is injection molded and the light emission component is extruded. Interconnection of the support component and light emission component includes heat stake, weld, snap-fit such as annular snap fit or cantilever snap fit, adhesive, adhesive tape, fasteners or interference fit.

Insert injection molding is a manufacturing process that includes an insert element that is placed into the mold cavity prior to injecting material to encapsulate the insert element. The insert element may be manufactured, for example, by extrusion, co-extrusion, injection molding, or even formed applications wherein a malleable material such as metal is formed into a desired size and shape. In one embodiment, the insert element is the light emission component such that the support component is injected molded to encapsulate the insert element. In another embodiment, the insert element is the support component such that the light emission component is injected molded to encapsulate the insert element.

Two-shot injection molding allows the production of an apparatus from two different materials, which may further be of different color, at the same time during one machine cycle.

The two different materials may be joined to form the apparatus, for example, through a heat and pressure process or bonded through mechanical interference. In one embodiment, the support component and light emission component are manufactured with a two-shot injection molding process.

In embodiments wherein the light emission component includes a substrate element, the light emission component and substrate element may be manufactured using extrusion, co-extrusion, injection molding, insert injection molding and two-shot injection molding. The light emission component including substrate element and support component are then assembled with the support component such as by insert injection molding. In embodiments where the support component is manufactured via extrusion, injection molding, or insert injection molding, the light emission component including substrate element are interconnected to the support component. Again, interconnection includes heat stake, weld, snap-fit such as annular snap fit or cantilever snap fit, adhesive, adhesive tape, fasteners or interference fit.

Other embodiments include separately manufacturing each of the light emission component, substrate element and support component such as by extrusion, injection molding or insert injection molding. Then, the light emission component, substrate element and support component are interconnected.

Yet other embodiments may include manufacturing the support component and substrate element such as by co-extrusion, injection molding, insert injection molding, or two-shot molding. The light emission component may then be assembled with the support component such as by insert injection molding. In embodiments where the light emission component is manufactured via extrusion, injection molding, or insert injection molding, the light emission component is interconnected to the support component including substrate element. As mentioned above, interconnection includes heat stake, weld, snap-fit such as annular snap fit or cantilever snap fit, adhesive, adhesive tape, fasteners or interference fit. Also mentioned above, weld includes, for example, sonic weld, vibration weld, orbital weld, ultrasonic weld, frictional weld, spin weld and laser weld.

An object of the present invention is to provide an improved safety handrail that complies with all current and future contemplated industry standards and specifications, including National Fire Protection Association (NFPA), International Code Compliance (ICC), American National Standards Institute (ANSI), International Residential Code (IRC), and American with Disabilities Act (ADA).

Another object of the present invention is to quickly evacuate people in the case of an emergency.

Another object of the present invention is to provide an improved safety handrail manufactured by extrusion, co-extrusion, injection molding, insert injection molding, two-shot injection molding, or any combination thereof.

Yet another object of the present invention is to provide an interconnecting improved safety handrail system. The present invention allows configuration into any desired length handrail by interconnecting any number of individual handrail apparatuses.

Yet another object of the present invention is to provide an improved safety handrail that requires little to no maintenance and the light emission component cannot lift or peel away from the support component.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will be described in conjunction with the appended drawings provided to illustrate and not to the limit the invention, where like designations denote like elements, and in which:

FIG. 1A is a perspective view of an improved safety handrail apparatus in accordance with one embodiment of the present invention;

FIG. 1B is a perspective view of an end cap component of an improved safety handrail apparatus in accordance with another embodiment of the present invention;

FIG. 2A is a perspective view of a support component and light emission component of an improved safety handrail apparatus in accordance with one embodiment of the present invention;

FIG. 2B is a perspective view of a support component and light emission component of an improved safety handrail apparatus in accordance with another embodiment of the present invention;

FIG. 2C is a perspective view of a support component and light emission component of an improved safety handrail apparatus in accordance with another embodiment of the present invention;

FIG. 4A is a perspective view of one embodiment of a light emission component of an improved safety handrail apparatus in accordance with one embodiment of the present invention;

FIG. 4B is a perspective view of another embodiment of a light emission component including substrate element of an improved safety handrail apparatus in accordance with another embodiment of the present invention;

DETAILED DESCRIPTION OF EMBODIMENTS OF THE INVENTION

Figure 3A:
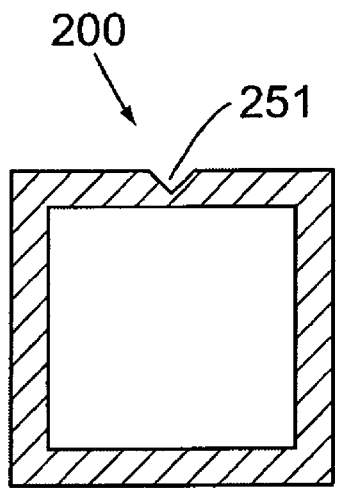
FIG. 3A is an end view of a channel element of a support component of an improved safety handrail apparatus in accordance with an embodiment of the present invention.

Preferred embodiments of a safety handrail apparatus according to the present invention are generally shown by referring to the accompanying drawings.

FIG. 1A is a perspective view of a support component 100 of an improved safety handrail apparatus 10 in accordance with one embodiment of the present invention. The handrail apparatus 10 includes a support component 100, channel element 200 and a light emission component 300.

Support component 100 extends from a first end 103 to a second end 104 and includes an inside surface 101 and an outside surface 102. Channel element 200 is positioned on the outside surface 102 of support component 100. It is contemplated that any number of channel elements 200, in any configuration, can be positioned on the outside surface 102 of support component 100.

In certain embodiments, the channel element 200 includes a depth up to and including ⅛ inch from the outside surface 102, although any depth for the channel element 200 is contemplated. The channel element 200 may be between and including ⅝ inch to 2½ inches in width along the entire length of the support component 100. Light emission component 300 is positioned within channel element 200, and similar to the channel element 200 may be between and including ⅝ inch to 2½ inches in width.

The support component 100 may further include a connecting element 400 on one or both of the first end 103 and second end 104. Connecting element 400 may engage with another connecting element 400 of another support component 100. This embodiment contemplates an interconnecting system so that any desired length handrail can be achieved by simply interconnecting the desired number of individual handrail apparatuses.

The apparatus 10 may further include an end cap component 500 as shown in FIG. 1B. End cap component 500 includes a base element 510 and an ornamental element 520. Ornamental element 520 includes any contemplated design, for example, ball, star, and flower. Base element 510 further includes an engagement element 530. Engagement element 530 connects with connecting element 400 of support component 100.

As shown in FIG. 2A, support component 100 is a square cross sectional component 110. Component 110 extends from a first end 113 to a second end 114 and includes an inside surface 111 and outside surface 112. Component 110 is made of a first face 115, second face 116, third face 117 and fourth face 118. As shown, component 110 includes a channel elements 202, 204 on the outside surface 112 of component 110. A first channel 202 is positioned on the first face 115 and a second channel 204 is positioned on the second face 116. A first light emission component 302 (not shown) is positioned within first channel element 202 and a second light emission component 304 is positioned within second channel element 204.

Square cross sectional support component 110 further includes a first end connecting element 403 on the first end 113 and a second end connecting element 404 on the second end 114. End connecting elements 403, 404 may engage with either connecting elements 400 of support components 100 and/or end cap components 500, more particularly the engagement element 530 of base element 510.

As shown in FIG. 2B, support component 100 is a circular cross sectional component 120. Component 120 extends from a first end 123 to a second end 124 includes an inside surface 121 and outside surface 122. As shown, component 120 includes a channel element 206 on the outside surface 122 of component 120. A light emission component 306 is positioned within channel element 206. Circular cross sectional support component 120 further includes a first end connecting element 405 on the first end 123 and a second end connecting element 406 on the second end 124. End connecting elements 405, 406 may engage with either connecting elements 400 of support components 100 and/or end cap components 500.

As shown in FIG. 2C, support component 100 is a semi-circular cross sectional component 130. This embodiment contemplates assembly over existing handrails. Component 130 can be secured to the existing handrail in a variety of ways, for example, hardware such as screws, adhesive, clamps, interference fit to name a few. Component 130 extends from a first end 133 to a second end 134 includes an inside surface 131 and outside surface 132. As shown, component 130 includes a channel element 208 on the outside surface 132 of component 130. A light emission component 308 is positioned within channel element 208. Component 130 may further include a living hinge element 180 that extends from the first end 133 to the second end 134 to assist in assembling the handrail apparatus over existing handrails. Living hinge element 180 can be positioned anywhere on the support component 100, including under or within the channel element 208. Semi-circular cross sectional support component 130 may further include a first end connecting element 407 on the first end 133 and a second end connecting element 408 on the second end 134. End connecting elements 407, 408 may engage with either connecting elements 400 of support components 100 and/or end cap components 500.

Figure 3B:
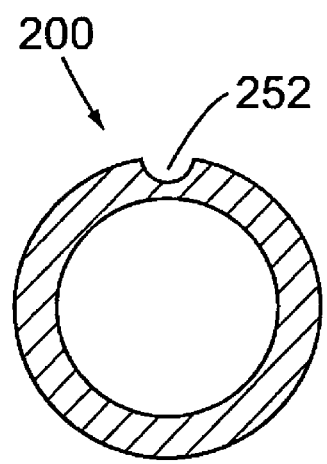
FIG. 3B is an end view of a channel element of a support component of an improved safety handrail apparatus in accordance with another embodiment of the present invention.
Figure 3C:
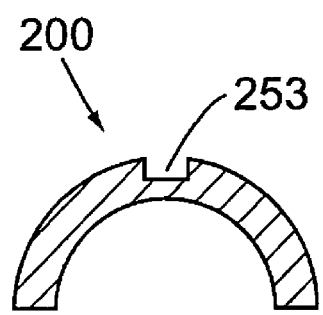
FIG. 3C is an end view of a channel element of a support component of an improved safety handrail apparatus in accordance with another embodiment of the present invention.

FIG. 3A-FIG. 3C illustrate various embodiments of channel elements 200. FIG. 3A illustrates a triangular shaped channel element 251, FIG. 3B illustrates a circular shaped channel element 252 and FIG. 3C illustrates a square shaped channel element 253, although any sized and shaped channel element 200 is contemplated that can be manufactured via extrusion or injection molding and sufficiently retains light emission component 300.

FIG. 4A-FIG. 4B illustrates various embodiments of the light emission component 300. As shown in FIG. 4A, light emission component 300 extends from a proximate end 323 to a distant end 324 and includes an interior surface 321 and an exterior surface 322. FIG. 4B illustrates an embodiment where the light emission component 300 includes a substrate element 350. As shown, substrate element 350 extends from a near end 353 to a far end 354 and includes an inner surface 351 and an outer surface 352. In embodiments where the light emission component 300 includes a substrate element 350, the outer surface 352 of the substrate element 350 substantially abuts the interior surface 321 of the light emission component 300. The substrate element 350 may intensify the illumination of the light emission component 300 by preventing the support component 100 from "bleeding through" the light emission component 300.

The support component 100 and light emission component 300 of the improved safety handrail apparatus 10 are manufactured by extrusion, co-extrusion, injection molding, insert injection molding, two shot molding or a combination thereof. For example, the support component 100 and light emission component 300 may be integrally extruded to achieve the improved safety handrail apparatus 10 according to the present invention. In another embodiment according to the present invention, the support component 100 and the light emission component 300 are co-extruded to achieve the improved safety handrail apparatus 10.

Figure 5:
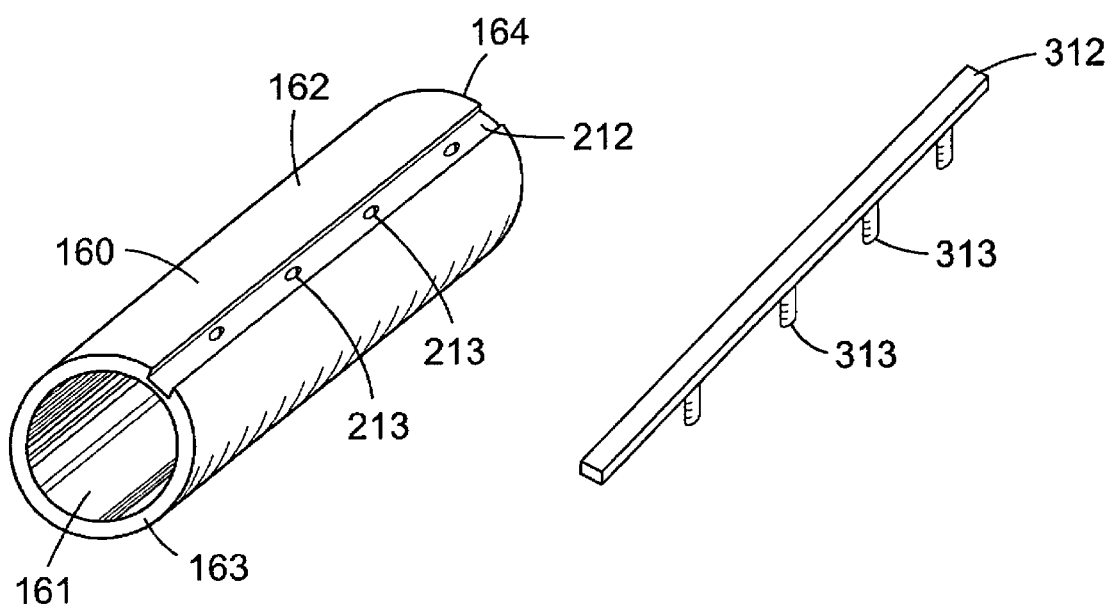
FIG. 5 illustrates one embodiment of improved manufacturing of a support component and light emission component of an improved safety handrail apparatus in accordance with the present invention.

In yet another embodiment, the support component 100 and light emission component 300 are individually injection molded. The support component 100 and light emission component 300 are then interconnected. FIG. 5 illustrates this embodiment of improved manufacturing. Support component 160 is injection molded extending from a first end 163 to a second end 164 and includes an inside surface 161 and outside surface 162. As shown, component 160 includes a channel element 212 on the outside surface 162. Channel element 212 includes a plurality of aperture elements 213. A light emission component 312 is injection molded wherein the light emission component 312 includes pins 313. Subsequent to the injection molding of both components, they are interconnected. Light emission component 312 is positioned within channel element 212 such that pins 313 of light emission component 312 engage with aperture elements 213. Pins 313 are placed within aperture elements 213 to interconnect the light emission component 312 with support component 160 to form an improved safety handrail apparatus according to the present invention. In this embodiment pins 313 are interconnected to aperture elements 213 by heat staking, but it is also contemplated that pins and aperture elements can be interconnected by weld, snap-fit, adhesive, adhesive tape, fasteners or interference fit.

It is also contemplated that the support component 100 may be extruded and the light emission component 300 may be injection molded or the support component 100 injection molded and the light emission component 300 extruded whereupon the support component 100 and light emission component 300 are interconnected.

In yet another embodiment of the present invention, the handrail apparatus 10 is insert injection molded. The light emission component 300 is an insert element such that the support component 100 encapsulates the light emission component 300. In another embodiment, the support component 100 is an insert element such that the light emission component 300 encapsulates the support component 100.

In yet another contemplated embodiment, the support component 100 and light emission component 300 are manufactured with a two-shot injection molding process.

In embodiments where the light emission component 300 includes a substrate element 350, the light emission component 300 and substrate element 350 may be manufactured using extrusion, co-extrusion, injection molding, insert injection molding and two-shot injection molding. The light emission component 300 including substrate element 350 and support component 100 are then assembled with the support component 100 such as by insert injection molding. In embodiments where the support component 100 is manufactured via extrusion, injection molding, or insert injection molding, the light emission component including substrate element 350 are interconnected to the support component 100. As mentioned above, interconnection includes heat stake, weld, snap-fit such as annular snap fit or cantilever snap fit, adhesive, adhesive tape, fasteners or interference fit. Also mentioned above, weld includes, for example, sonic weld, vibration weld, orbital weld, ultrasonic weld, frictional weld, spin weld and laser weld.

Other embodiments include separately manufacturing each of the light emission component 300, substrate element 350 and support component 100 such as by extrusion, injection molding or insert injection molding. Then, the light emission component 300, substrate element 350 and support component 100 are interconnected.

Yet other embodiments may include manufacturing the support component 100 and substrate element 350 such as by co-extrusion, injection molding, insert injection molding, or two-shot molding. The light emission component 300 may then be assembled with the support component 100 such as by insert injection molding. In embodiments where the light emission component 300 is manufactured via extrusion, injection molding, or insert injection molding, the light emission component 300 is interconnected to the support component 100 including substrate element 350.

Figure 6A:
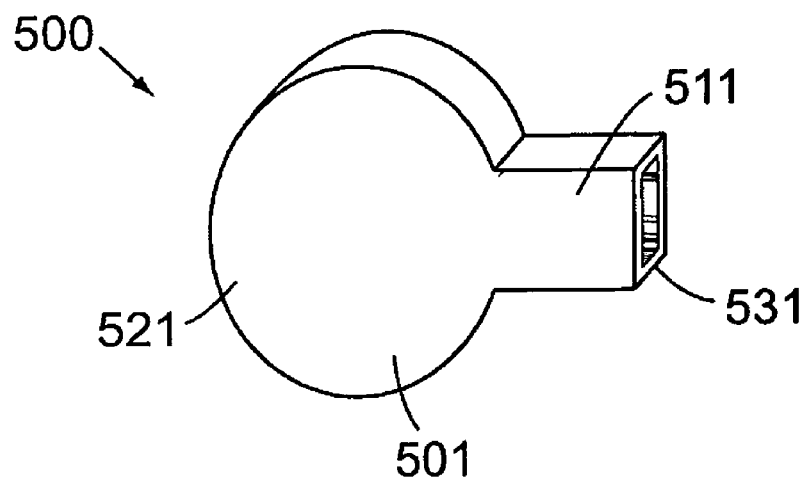
FIG. 6A is a perspective view of an end cap component of an improved safety handrail apparatus in accordance with one embodiment of the present invention.

FIG. 6A is a perspective view of an end cap component 500 of an improved safety handrail apparatus in accordance with one embodiment of the present invention. End cap component 501 includes a base element 511, ornamental element 521 and an engagement element 531. Base element 511 is sized and shaped such that engagement element 531 engages with connecting elements 400 of support components 100. As shown in FIG. 6A, ornamental element 521 is a spherical ball, although any design is contemplated, for example, a star shaped ornamental element 522 as shown in FIG. 6B.

Figure 6B:
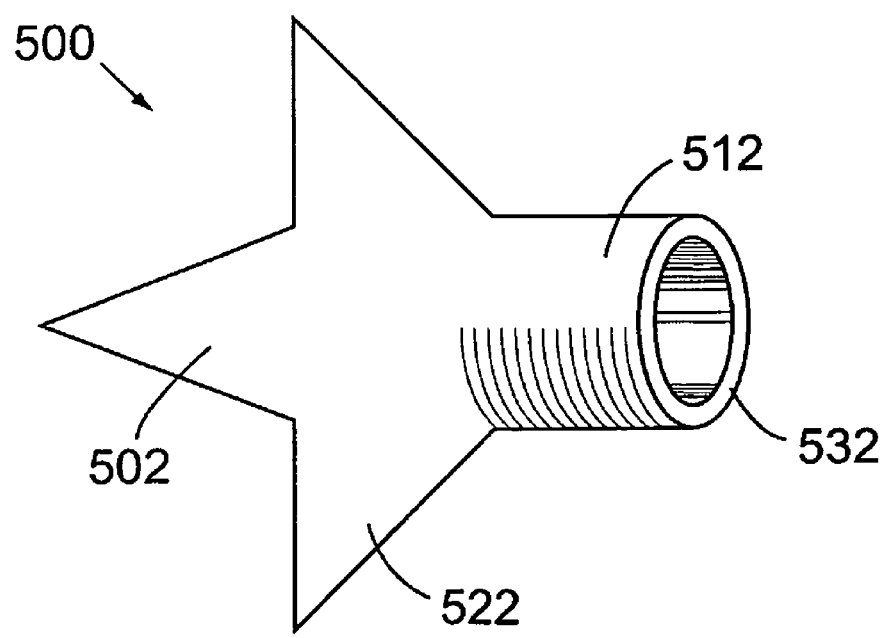
FIG. 6B is a perspective view of an end cap component of an improved safety handrail apparatus in accordance with another embodiment of the present invention.

FIG. 6B is a perspective view of an end cap component 502 of an improved safety handrail apparatus in accordance with another embodiment of the present invention. End cap component 502 includes a base element 512 sized and shaped such that engagement element 532 engages with connecting elements 400 of support components 100.

Figure 7:
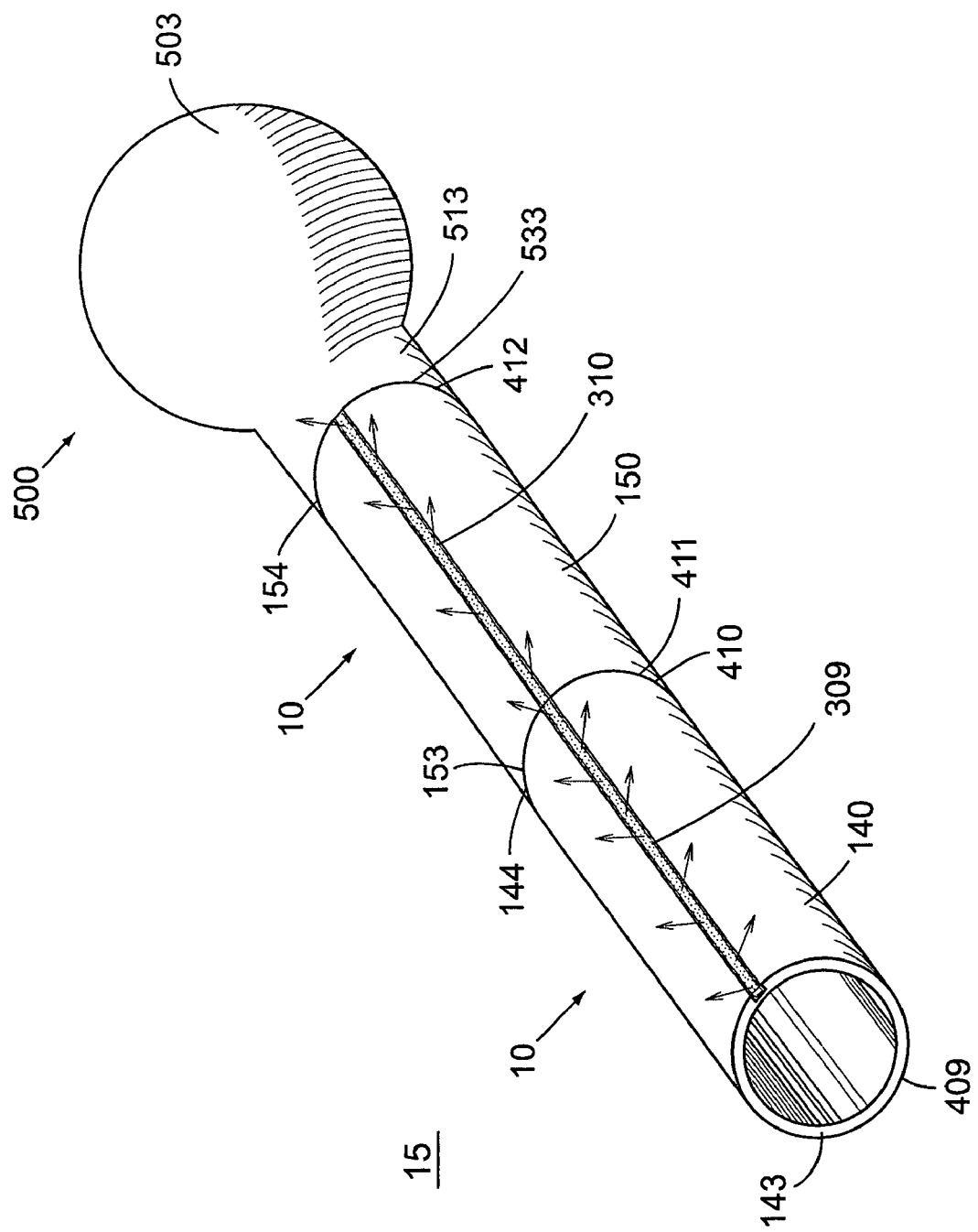
FIG. 7 is a perspective view of an interconnected improved safety handrail apparatus in accordance with an embodiment of the present invention.

FIG. 7 is a perspective view of an interconnected improved safety handrail apparatus 15 in accordance with an embodiment of the present invention. As shown, two handrail apparatuses 10 and an end cap component 500 are interconnected. Support component 140 includes a first connecting element 409 at the first end 143 and a second connecting element 410 at the second end 144. Support component 150 includes a third connecting element 411 at the first end 153 and a fourth connecting element 412 at the second end 154. End cap component 503 includes a base element 513 with an engagement element 533.

To interconnect the improved safety handrail apparatus 15 in this embodiment, the second connecting element 410 of support component 140 interconnects with the third connecting element 411 of support component 150 and the fourth connecting element 412 of support component 150 engages with engagement element 533 of base element 513 of end cap component 503. The improved safety handrail apparatus 15 is interconnected such that light emission component 309 of the support component 140 aligns with light emission component 310 of the support component 150.

It will be understood that the embodiments of the present invention, which have been described, are illustrative of some of the applications of the principles of the present invention. Numerous modifications may be made by those skilled in the art without departing from the true spirit and scope of the invention.

What is claimed is:

1. A safety handrail apparatus, comprising:
a flexible support component extending from a first end to a distal second end, said flexible support component being a hollow body defined by an inside surface, an outside surface and a discontinuity along its length;
a channel element positioned on said outside surface of said flexible support component extending from said first end of said flexible support component to said distal second end of said flexible support component;
a light emission component extending from a proximate end to a distant end including an interior surface and an exterior surface;
a substrate element extending from a near end to a far end and including an inner surface and an outer surface, wherein said outer surface of said substrate element substantially abuts said interior surface of said light emission component, said light emission component and said substrate element positioned within said channel element such that said near end of said substrate element and said proximate end of said light emission component terminate at said first end of said flexible support component, said far end of said substrate element and said distant end of said light emission component terminate at said distal second end of said flexible support component;
said flexible support component, said light emission component and said substrate element are merged and welded together; and
wherein the flexibility of said flexible support component exists along the length thereof to facilitate assembly of the handrail apparatus over an existing handrail such that said inside surface of said flexible support component is configured to be directly assembled about and positively engaging be directly assembled to an existing handrail.

2. The safety handrail apparatus of claim 1, wherein the safety handrail apparatus is configured to be adhered to an existing handrail by applying adhesive to said inside surface of said flexible support component.

3. The safety handrail apparatus of claim 1, wherein said inside surface of said flexible support component is configured to be snap fit to an existing handrail.

4. The safety handrail apparatus of claim 1, wherein said light emission component is one selected from the group comprising of strontium oxide, strontium aluminate, calcium sulfide, strontium sulfide, zinc sulfide, and cadmium sulfide.

5. The safety handrail apparatus of claim 1, wherein said flexible support component is constructed of a polymer material selected from the group comprising of polypropylene, polyester and polyvinyl chloride.

6. The safety handrail apparatus of claim 1, wherein said substrate element is constructed of a white polymer material selected from the group comprising of polypropylene, polyester and polyvinyl chloride.

7. The safety handrail apparatus of claim 1, wherein said flexible support component is a semi-circular cross sectional component.

8. The safety handrail apparatus of claim 1, wherein said light emission component is 5/8 inch to 2½ inches in width.

9. The safety handrail apparatus of claim 8, wherein said light emission component is 1 inch to 1¼ inches in width.

10. A safety handrail apparatus, comprising:
a flexible support component extending from a first end to a distal second end, said flexible support component being a hollow body defined by an inside surface, an outside surface and a discontinuity along its length;
a channel element positioned on said outside surface of said flexible support component extending from said first end of said flexible support component to said distal second end of said flexible support component;
a light emission component extending from a proximate end to a distant end including an interior surface and an exterior surface, wherein said light emission component is positioned within said channel element such that said proximate end of said light emission component terminates at said first end of said flexible support component and said distant end of said light emission component terminates at said distal second end of said flexible support component;
said flexible support component and said light emission component are merged and welded together such that wherein the flexibility of said flexible support component exists along the length thereof to facilitate assembly of the handrail apparatus over an existing handrail such that said inside surface of said flexible support component is configured to be directly assembled about and positively engaging be directly assembled to an existing handrail.

11. The safety handrail apparatus of claim 10, wherein the safety handrail apparatus is configured to be adhered to an existing handrail by applying adhesive to said inside surface of said flexible support component.

12. The safety handrail apparatus of claim 10, wherein said inside surface of said flexible support component is configured to be snap fit to an existing handrail.

13. The safety handrail apparatus of claim 10, wherein said light emission component is one selected from the group comprising of strontium oxide, strontium aluminate, calcium sulfide, strontium sulfide, zinc sulfide, and cadmium sulfide.

14. The safety handrail apparatus of claim 10, wherein said flexible support component is constructed of a polymer material selected from the group comprising of polypropylene, polyester and polyvinyl chloride.

15. The safety handrail apparatus of claim 10, wherein said flexible support component is white.

16. The safety handrail apparatus of claim 10, wherein said flexible support component is a semi-circular cross sectional component.

17. The safety handrail apparatus of claim 10, wherein said light emission component is 5/8 inch to 2½ inches in width.

18. The safety handrail apparatus of claim 17, wherein said light emission component is 1 inch to 1¼ inches in width.

* * * * *

UNITED STATES PATENT AND TRADEMARK OFFICE
CERTIFICATE OF CORRECTION

PATENT NO.         : 7,934,701 B2
APPLICATION NO.    : 12/215971
DATED              : May 3, 2011
INVENTOR(S)        : Ronald J. Kay Page 1 of 1

It is certified that error appears in the above-identified patent and that said Letters Patent is hereby corrected as shown below:

Claim 1 at column 11, line 3, delete "be directly assembled to"

Claim 10 at column 12, line 8, delete "such that"

Claim 10 at column 12, line 14, delete "be directly assembled to"

Signed and Sealed this
Sixteenth Day of August, 2011

David J. Kappos
*Director of the United States Patent and Trademark Office*